(12) United States Patent
Chen et al.

(10) Patent No.: US 11,429,869 B2
(45) Date of Patent: Aug. 30, 2022

(54) ARTIFICIALLY INTELLIGENT INTERACTION AGENT

(71) Applicant: INTERNATIONAL BUSINESS MACHINES CORPORATION, Armonk, NY (US)

(72) Inventors: Si Chen, Slingerlands, NY (US); Stefanos Manganaris, Cincinnati, OH (US); Patricia R. Stern, Bethesda, MD (US)

(73) Assignee: International Business Machines Corporation, Armonk, NY (US)

( * ) Notice: Subject to any disclaimer, the term of this patent is extended or adjusted under 35 U.S.C. 154(b) by 484 days.

(21) Appl. No.: 16/690,744

(22) Filed: Nov. 21, 2019

(65) Prior Publication Data

US 2021/0158172 A1    May 27, 2021

(51) Int. Cl.
*G06N 3/08* (2006.01)
*G06K 9/62* (2022.01)
*G06N 3/04* (2006.01)

(52) U.S. Cl.
CPC .......... *G06N 3/088* (2013.01); *G06K 9/6263* (2013.01); *G06N 3/0454* (2013.01)

(58) Field of Classification Search
CPC ...... G06N 3/088; G06N 3/0454; G06N 3/006; G06N 7/005; G06K 9/6263; G06K 9/6272; G06V 10/82
See application file for complete search history.

(56) References Cited

U.S. PATENT DOCUMENTS

| | | | |
|---|---|---|---|
| 7,769,623 B2 | 8/2010 | Mittal et al. | |
| 8,924,318 B2 | 12/2014 | Newnham et al. | |
| 11,226,673 B2 * | 1/2022 | Wang | G06N 5/02 |
| 11,330,333 B2 * | 5/2022 | Puente Pestaña | H04L 47/38 |
| 2017/0330077 A1 | 11/2017 | Williams et al. | |

(Continued)

FOREIGN PATENT DOCUMENTS

| | | | | |
|---|---|---|---|---|
| CN | 109003143 A | | 12/2018 | |
| EP | 3579154 A1 * | | 12/2019 | G06N 20/00 |
| WO | 2005020044 A1 | | 3/2005 | |

OTHER PUBLICATIONS

White, "A Survey of Applications of Markov Decision Processes," The Journal of the Operational Research Society, vol. 44, No. 11, Nov. 1993, pp. 1073-1096.

(Continued)

*Primary Examiner* — Mohammad K Islam
(74) *Attorney, Agent, or Firm* — Conley Rose, P.C.

(57) ABSTRACT

A system includes a memory having instructions therein and at least one processor configured to execute the instructions to: begin control of a user-interaction session; determine a first user state; use a reinforcement learning agent to select a first motivational action; communicate the first motivational action to a user device; determine a second user state; generate a reward based at least in part on a tiered reinforcement learning reward categorization of the second user state; communicate the reward and the second user state to the reinforcement learning agent; update the reinforcement learning agent; and determine, based at least in part on whether the second user state corresponds to a goal of the user-interaction session, to wind up control of the user-interaction session.

20 Claims, 8 Drawing Sheets

(56) References Cited

U.S. PATENT DOCUMENTS

| | | | |
|---|---|---|---|
| 2018/0218080 A1 | 8/2018 | Krishnamurthy et al. | |
| 2018/0356793 A1* | 12/2018 | Kanemaru | G06N 3/006 |
| 2018/0374138 A1 | 12/2018 | Mohamed | |
| 2019/0064756 A1* | 2/2019 | Tajima | G01L 5/24 |
| 2019/0317457 A1* | 10/2019 | Shinoda | G05B 19/4063 |
| 2020/0057416 A1* | 2/2020 | Matsubara | F01K 23/101 |
| 2020/0065682 A1* | 2/2020 | Paulina | G09B 19/00 |
| 2020/0250575 A1* | 8/2020 | Ie | G06N 3/084 |
| 2020/0370409 A1* | 11/2020 | Yu | E21B 47/12 |
| 2021/0192358 A1* | 6/2021 | Song | G06N 3/0454 |
| 2022/0147034 A1* | 5/2022 | Geipel | G06N 7/005 |

OTHER PUBLICATIONS

Krass, et al., "A Weighted Markov Decision Process," Operations Research, vol. 40, No. 6, Nov.-Dec. 1992, pp. 1180-1187.

Busic, et al., "Action-Constrained Markov Decision Processes with Kullback-Leibler Cost," arXiv:1807.10244v1 [math.OC], Jul. 26, 2018, 13 pages.

Metelli, et al., "Configurable Markov Decision Process," arXiv:1806.05415v1, [cs.AI], Jun. 14, 2018, Proceedings of the 35 th International Conference on Machine Learning, Stockholm, Sweden, PMLR 80, 2018, 27 pages.

Goncalves, "Constrained Markov Decision Processes," Apr. 16, 2007, 21 pages.

Baykal-Gürsoy, M., Semi-Markov Decision Processes, Wiley Online Library, https://onlinelibrary.wiley.com/doi/abs/10.1002/9780470400531.eorms0757, John Wiley & Sons, Inc., Feb. 15, 2011., 12 pages.

Schaefer, "Markov Decision Processes," EWO Seminar, Oct. 26, 2006, 47 pages.

Bouyer, et al., "Multi-Weighted Markov Decision Processes with Reachability Objectives," A. Orlandini, M. Zimmermann (Eds.): 9th Symposium on Games, Automata, Logics and Formal Verification (GandALF'18) EPTCS 277, 2018, pp. 250-264, doi:10.4204/EPTCS.277.18.

Bradtke, Steven J., and Duff, Michael O., Reinforcement Learning Methods for Continuous-Time Markov Decision Problems, NIPS'94 Proceedings of the 7th International Conference on Neural Information Processing Systems, pp. 393-400, MIT Press, Cambridge, MA, Jan. 1, 1994.

Toussaint, et al., "Probabilistic Inference for Solving Discrete and Continuous State Markov Decision Processes," Proceedings of the 23rd International Conference on Machine Learning, Pittsburgh, PA, 2006, 8 pages.

\* cited by examiner

ARTIFICIALLY INTELLIGENT INTERACTION AGENT

BACKGROUND

The present disclosure relates generally to the field of cognitive computing and, more particularly, to interaction design and artificial intelligence.

According to Wikipedia, interaction design has been characterized as "the practice of designing interactive digital products, environments, systems, and services," and is often abbreviated as IxD. According to the Interaction Design Association, "Interaction Design (IxD) defines the structure and behavior of interactive systems" and "Interaction Designers strive to create meaningful relationships between people and the products and services that they use, from computers to mobile devices to appliances and beyond." One commentator has remarked that: "Interaction design is goal-driven design; users interact with an interface to accomplish a goal or better yet, a set of goals, whether it's buying something, getting somewhere, contacting someone, and so forth. The ultimate goal of interaction design is to design for those goals."

Meanwhile, various abilities of machines to acquire and apply knowledge and skills have been categorized as artificial intelligence ("AI"). Machine learning has been considered to be a form of AI. Machine learning has employed algorithms and statistical models that have enabled computer systems use to perform tasks without using explicit instructions, relying on patterns and inferences instead. Supervised learning has been an area of machine learning concerned with employing mathematical models based on sample data (i.e., "training data") that has been generated as a result of environmental responses to known stimuli (i.e., "input data"). Reinforcement learning has been an area of machine learning concerned with developing and using machines, typically referred to as "agents," to operate in or on an environment so as to maximize some notion of cumulative reward. Unlike supervised learning, reinforcement learning has typically not relied on labelled input/output pairs or explicit corrections of sub-optimal actions. Instead, reinforcement learning has typically focused on finding balances between explorations of uncharted territory and exploitations of current knowledge.

SUMMARY

A method is disclosed. The method includes beginning control of a user-interaction session. The method also includes receiving a first communication from a user device. The method also includes determining a first user state based at least in part on the first communication from the user device. The method also includes communicating the first user state to a reinforcement learning agent. The method also includes using the reinforcement learning agent to select a first motivational action based at least in part on the first user state. The method also includes communicating the first motivational action to the user device. The method also includes receiving a second communication from the user device. The method also includes determining a second user state based at least in part on the second communication from the user device, the second user state comprising an attribute conveying a tiered reinforcement learning reward categorization. The method also includes generating a reward based at least in part on the tiered reinforcement learning reward categorization. The method also includes communicating the reward to the reinforcement learning agent. The method also includes communicating the second user state to the reinforcement learning agent. The method also includes updating the reinforcement learning agent. The method also includes determining, based at least in part on whether the second user state corresponds to a goal of the user-interaction session, to wind up control of the user-interaction session.

A system is also disclosed. The system includes a memory having instructions therein and at least one processor in communication with the memory. The at least one processor is configured to execute the instructions to begin control of a user-interaction session. The at least one processor is also configured to execute the instructions to receive a first communication from a user device. The at least one processor is also configured to execute the instructions to determine a first user state based at least in part on the first communication from the user device. The at least one processor is also configured to execute the instructions to communicate the first user state to a reinforcement learning agent. The at least one processor is also configured to execute the instructions to use the reinforcement learning agent to select a first motivational action based at least in part on the first user state. The at least one processor is also configured to execute the instructions to communicate the first motivational action to the user device. The at least one processor is also configured to execute the instructions to receive a second communication from the user device. The at least one processor is also configured to execute the instructions to determine a second user state based at least in part on the second communication from the user device, the second user state comprising an attribute conveying a tiered reinforcement learning reward categorization. The at least one processor is also configured to execute the instructions to generate a reward based at least in part on the tiered reinforcement learning reward categorization. The at least one processor is also configured to execute the instructions to communicate the reward to the reinforcement learning agent. The at least one processor is also configured to execute the instructions to communicate the second user state to the reinforcement learning agent. The at least one processor is also configured to execute the instructions to update the reinforcement learning agent. The at least one processor is also configured to execute the instructions to determine, based at least in part on whether the second user state corresponds to a goal of the user-interaction session, to wind up control of the user-interaction session.

A computer program product is also disclosed. The computer program product includes a computer readable storage medium having program instructions embodied therewith. The program instructions are executable by at least one processor to cause the at least one processor to begin control of a user-interaction session. The program instructions are also executable by the at least one processor to cause the at least one processor to receive a first communication from a user device. The program instructions are also executable by the at least one processor to cause the at least one processor to determine a first user state based at least in part on the first communication from the user device. The program instructions are also executable by the at least one processor to cause the at least one processor to communicate the first user state to a reinforcement learning agent. The program instructions are also executable by the at least one processor to cause the at least one processor to use the reinforcement learning agent to select a first motivational action based at least in part on the first user state. The program instructions are also executable by the at least one processor to cause the at least one processor to communicate the first motivational action to the user device. The program instructions are also executable by the at least one processor to cause the at least one processor to receive a second communication from the user device. The program instructions are also executable by the at least one processor to cause the at least one processor to determine a second user state based at least in part on the second communication from the user device, the second user state comprising an attribute conveying a tiered reinforcement learning reward categorization. The program instructions are also executable by the at least one processor to cause the at least one processor to generate a reward based at least in part on the tiered reinforcement learning reward categorization. The program instructions are also executable by the at least one processor to cause the at least one processor to communicate the reward to the reinforcement learning agent. The program instructions are also executable by the at least one processor to cause the at least one processor to communicate the second user state to the reinforcement learning agent. The program instructions are also executable by the at least one processor to cause the at least one processor to update the reinforcement learning agent. The program instructions are also executable by the at least one processor to cause the at least one processor to determine, based at least in part on whether the second user state corresponds to a goal of the user-interaction session, to wind up control of the user-interaction session.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
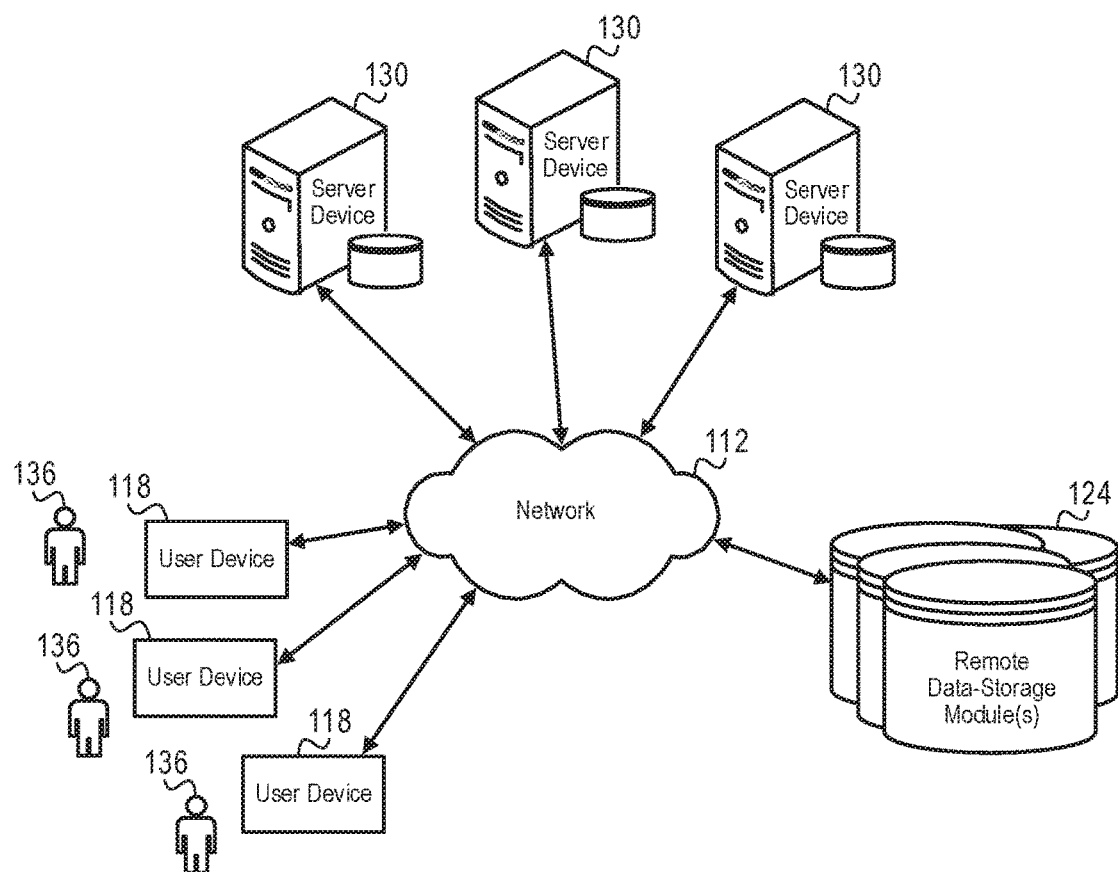
FIG. 1 is a block diagram illustration of a network environment in accordance with aspects of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" (and inflections thereof) are used in an open-ended fashion, and thus should be interpreted to mean "including, but not limited to." Unless otherwise indicated, as used throughout this document, "or" does not require mutual exclusivity, and the singular forms "a," "an," and "the" are intended to include the plural forms as well, unless the context clearly indicates otherwise.

A "module" or "unit" (and inflections thereof) as referenced herein comprises one or more hardware or electrical components such as electrical circuitry, processors, and memory that may be specially configured to perform a particular function. The memory may comprise volatile memory or non-volatile memory that stores data such as, but not limited to, computer executable instructions, machine code, and other various forms of data. The module or unit may be configured to use the data to execute one or more instructions to perform one or more tasks. In certain instances, a module or unit may also refer to a particular set of functions, software instructions, or circuitry that is configured to perform a specific task. For example, a module or unit may comprise software components such as, but not limited to, data access objects, service components, user interface components, application programming interface ("API") components; hardware components such as electrical circuitry, processors, and memory; and/or a combination thereof. As referenced herein, computer executable instructions may be in any form including, but not limited to, machine code, assembly code, and high-level programming code written in any programming language.

Also, as used herein, the term "communicate" (and inflections thereof) means to receive and/or transmit data or information over a communication link. The communication link may include both wired and wireless links, and may comprise a direct link or may comprise multiple links passing through one or more communication networks or network devices such as, but not limited to, routers, firewalls, servers, and switches. The communication networks may comprise any type of wired or wireless network. The networks may include private networks and/or public networks such as the Internet. Additionally, in some embodiments, the term communicate may also encompass internal communication between various components of a system and/or with an external input/output device such as a keyboard or display device.

Also, as used herein, the term "superuser-defined" (and inflections thereof) means provided by a system developer, system administrator, superuser, or other such extrinsic human or machine agent. Inputting, receiving, and/or otherwise suitably incorporating superuser-defined data, a superuser-defined parameter, a superuser-defined relationship, a superuser-defined rule, and/or any other superuser-defined quantity into any subject matter in accordance with aspects of the present disclosure may comprise (at any time prior to use of such quantity in accordance with aspects of the present disclosure) encoding such quantity into a suitable memory, incorporating such quantity into a suitable module or unit, selecting such quantity from a suitable drop-down or other menu, receiving such quantity as a suitable textual or audible input, receiving a suitable communication of such quantity from an external device, and/or any other one or more suitable approaches to incorporating such quantity into the subject matter. Further, as used herein, the term "superuser" refers to any system developer, system administrator, superuser, or other such extrinsic human or machine agent that may cause such a superuser-defined quantity to be inputted, received, and/or otherwise suitably incorporated in accordance with aspects of the present disclosure.

FIG. 1 is a block diagram illustration of a network environment 100 in accordance with aspects of the present disclosure. The network environment 100 includes a network 112, one or more user devices 118, one or more remote data-storage modules 124, one or more server devices 130, and one or more users 136. The network 112 comprises any type of network that enables the one or more server devices 130 to communicate with each other and with the one or more user devices 118 as well as with the one or more remote data-storage modules 124. For example, the network 112 may comprise one or more wired and/or wireless networks such as, but not limited to, one or more radio networks (e.g., cellular network or mobile network), one or more local area networks ("LANs"), one or more wide area networks ("WANs"), one or more metropolitan area networks ("MANs"), etc. The network 112 may also comprise one or more private networks and/or one or more public networks (such as, but not limited to, the Internet).

Each of the one or more user devices 118 is communicatively coupled to the network 112 and (through the network 112) to the one or more server devices 130 and the one or more remote data-storage modules 124. Each of the one or more user devices 118 comprises any type of device that allows the one or more users 136 to audibly, textually, or otherwise suitably interact with the one or more server devices 130 through the network 112. Non-limiting examples of one of the one or more user devices 118 include a personal computer (desktop or laptop), a mobile device (e.g., personal digital assistant ("PDA"), smart phone, tablet, etc.), and a cognitive voice assistant device (e.g., Amazon's Alexa®, a Google Home® device, etc.). In some embodiments, the one or more user devices 118 may comprise a corresponding one or more of a data processing system like the data processing system 600 (the data processing system 600 per se is not explicitly illustrated in FIG. 1, but see FIG. 5).

Each of the one or more remote data-storage modules 124 is communicatively coupled to the network 112 and (through the network 112) to each other and to the one or more server devices 130 and the one or more user devices 118. The one or more remote data-storage modules 124 are configured to (alone or in combination) store and provide access to various data that may be generated, modified, and/or used in accordance with aspects of the present disclosure. In some embodiments, the one or more remote data-storage modules 124 may comprise a corresponding one or more of a data processing system like the data processing system 600 (the data processing system 600 per se is not explicitly illustrated in FIG. 1, but see FIG. 5).

Each of the one or more server devices 130 is communicatively coupled to the network 112 and (through the network 112) to each other and to the one or more remote data-storage modules 124 and the one or more user devices 118. Each of the one or more server devices 130 comprises any type of device that can (alone or in combination with one or more other components of the network environment 100) implement an interaction agent module 200 in accordance with aspects of the present disclosure (the interaction agent module 200 per se is not explicitly illustrated in FIG. 1, but see FIG. 2). In some embodiments, the one or more server devices 130 may comprise a corresponding one or more of a data processing system like the data processing system 600 (the data processing system 600 per se is not explicitly illustrated in FIG. 1, but see FIG. 5). In some embodiments, the one or more server devices 130 may comprise one or more suitable computers, machines, modules, and/or devices provided by an Internet service provider.

Figure 2:
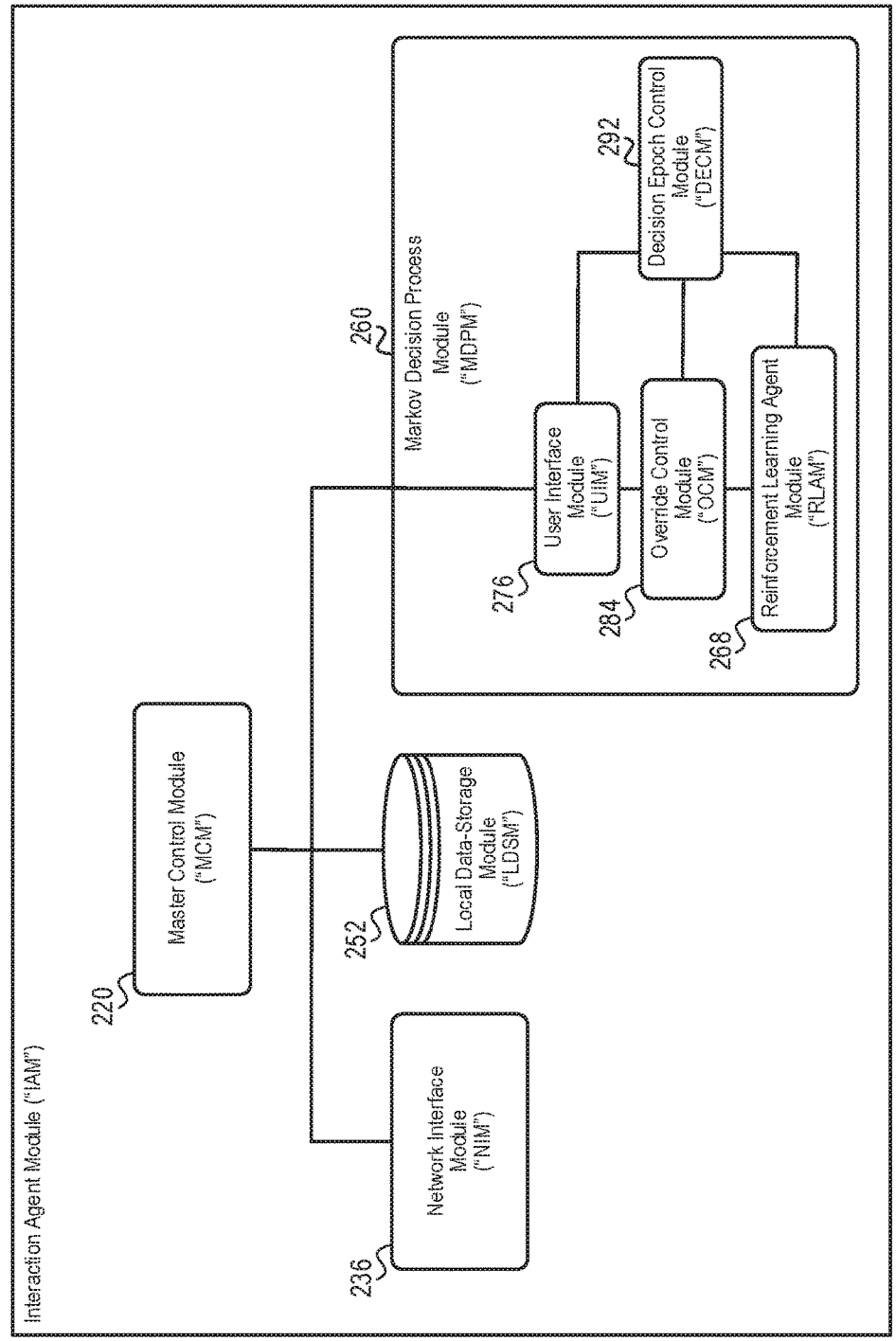
FIG. 2 is a block diagram illustration of an interaction agent module in accordance with aspects of the present disclosure.

FIG. 2 is a block diagram illustration of the interaction agent module ("IAM") 200 in accordance with aspects of the present disclosure. The IAM 200 is configured to interact (through the network 112 and the one or more user devices 118) with the one or more users 136 in accordance with aspects of the present disclosure (the network 112, the user devices 118, and the users 136 are not shown in FIG. 2, but see FIG. 1). In some embodiments, the IAM 200 may comprise one or more of a data processing system like the data processing system 600 (the data processing system 600 per se is not explicitly illustrated in FIG. 2, but see FIG. 5). In the depicted example, the IAM 200 comprises one or more of the server devices 130 (the server devices 130 per se are not explicitly illustrated in FIG. 2, but see FIG. 1).

The IAM 200 includes a master control module ("MCM") 220. The MCM 220 is configured to coordinate operations of other components of the IAM 200 and to acquire, process, and move data in support of such operations in accordance with aspects of the present disclosure. In some embodiments, the MCM 220 may comprise one or more of a data processing system like the data processing system 600 (the data processing system 600 per se is not explicitly illustrated in FIG. 2, but see FIG. 5).

The IAM 200 also includes a network interface module ("NIM") 236. The NIM 236 is communicatively coupled to, among other things, the MCM 220 and the network 112 (the network 112 per se is not explicitly illustrated in FIG. 2, but see FIG. 1). It should be appreciated that the NIM 236 is also communicatively coupled (through the network 112) to any number of the one or more user devices 118, any number of the one or more remote data-storage modules 124, and any number of the one or more server devices 130 (the user devices 118, the remote data-storage modules 124, and the server devices 130 are not shown in FIG. 2, but see FIG. 1). The NIM 236 is configured to communicatively couple and act as an interface between the MCM 220, various other components of the IAM 200, the network 112, and (through the network 112) various other components of the network environment 100 in accordance with aspects of the present disclosure. In some embodiments, the NIM 236 may comprise one or more of a data processing system like the data processing system 600 (the data processing system 600 per se is not explicitly illustrated in FIG. 2, but see FIG. 5).

The IAM 200 also includes a local data-storage module ("LDSM") 252. The LDSM 252 is communicatively coupled to, among other things, the MCM 220 and the NIM 236. It should be appreciated that the LDSM 252 is also communicatively coupled (through the NIM 236 and the network 112) to any number of the one or more user devices 118, any number of the one or more remote data-storage modules 124, and any number of the one or more server devices 130 (the user devices 118, the remote data-storage modules 124, and the server devices 130 are not shown in FIG. 2, but see FIG. 1). The LDSM 252 is configured to store and provide access to various data that may be generated, modified, and/or used in accordance with aspects of the present disclosure. In some embodiments, the LDSM 252 may comprise one or more of a data processing system like the data processing system 600 (the data processing system 600 per se is not explicitly illustrated in FIG. 2, but see FIG. 5).

The IAM 200 also includes a Markov decision process module ("MDPM") 260. The MDPM 260 is configured to implement a finite-state, overridable, tiered-rewarding, effectively continuous-sojourn-time Markov decision process 300 in accordance with aspects of the present disclosure (the process 300 per se is not explicitly illustrated in FIG. 2, but see FIG. 3). In some embodiments, the MDPM 260 may comprise one or more of a data processing system like the data processing system 600 (the data processing system 600 per se is not explicitly illustrated in FIG. 2, but see FIG. 5).

The MDPM 260 includes a reinforcement learning agent module (RLAM") 268. The RLAM 268 is configured to implement reinforcement learning agent tasks 304 of the process 300 in accordance with aspects of the present disclosure (the process 300 and the reinforcement learning agent tasks 304 are not shown in FIG. 2, but see FIG. 3). In some embodiments, the RLAM 268 may comprise one or more of a data processing system like the data processing system 600 (the data processing system 600 per se is not explicitly illustrated in FIG. 2, but see FIG. 5).

The MDPM 260 also includes a user interface module ("UIM") 276. The UIM 276 is communicatively coupled to, among other things, the MCM 220, the NIM 236, and the LDSM 252. It should be appreciated that the UIM 276 is also communicatively coupled (through the NIM 236 and the network 112) to any number of the one or more user devices 118, any number of the one or more remote data-storage modules 124, and any number of the one or more server devices 130 (the user devices 118, the remote data-storage modules 124, and the server devices 130 are not shown in FIG. 2, but see FIG. 1). The UIM 276 is configured to implement user interface tasks 308 of the process 300 in accordance with aspects of the present disclosure (the process 300 and the user interface tasks 308 are not shown in FIG. 2, but see FIG. 3). In some embodiments, the UIM 276 may comprise one or more of a data processing system like the data processing system 600 (the data processing system 600 per se is not explicitly illustrated in FIG. 2, but see FIG. 5).

The MDPM 260 also includes an override control module ("OCM") 284. The OCM 284 is communicatively interposed between the RLAM 268 and the UIM 276. The OCM 284 is configured to implement override control tasks 312 of the process 300 in accordance with aspects of the present disclosure (the process 300 and the override control tasks 312 are not shown in FIG. 2, but see FIG. 3). In some embodiments, the OCM 284 may comprise one or more of a data processing system like the data processing system 600 (the data processing system 600 per se is not explicitly illustrated in FIG. 2, but see FIG. 5).

The MDPM 260 also includes a decision epoch control module ("DECM") 292. The DECM 292 is communicatively coupled to the RLAM 268, the UIM 276, and the OCM 284. The DECM 292 is configured to coordinate operations of the RLAM 268, the UIM 276, and the OCM 284 and to acquire, process, and move data in support of such operations in accordance with aspects of the present disclosure. In some embodiments, the DECM 292 may comprise one or more of a data processing system like the data processing system 600 (the data processing system 600 per se is not explicitly illustrated in FIG. 2, but see FIG. 5).

Figure 3:
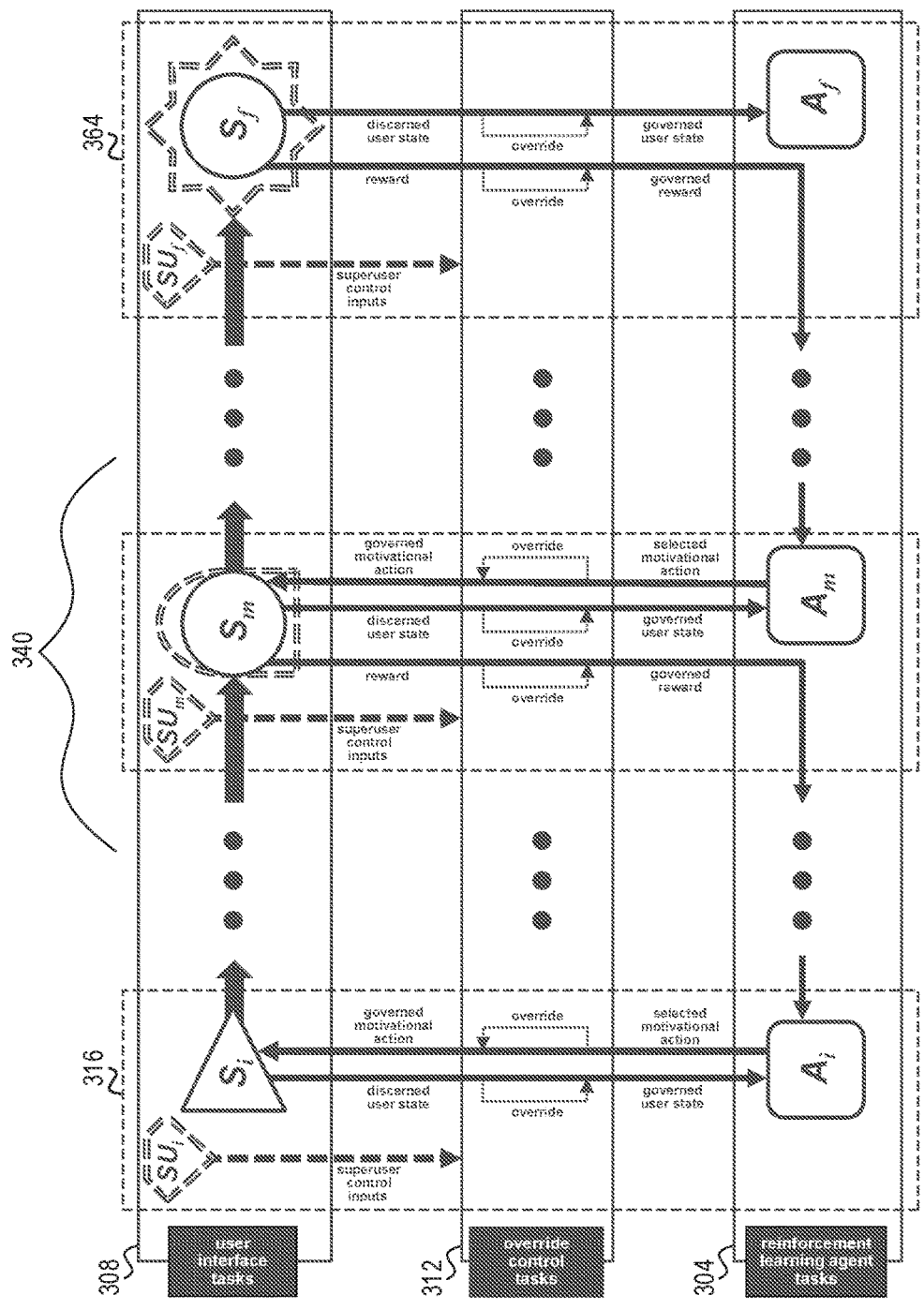
FIG. 3 is a process flow diagram illustration of a finite-state, overridable, tiered-rewarding, effectively continuous-sojourn-time Markov decision process in accordance with aspects of the present disclosure.
Figure 4A:
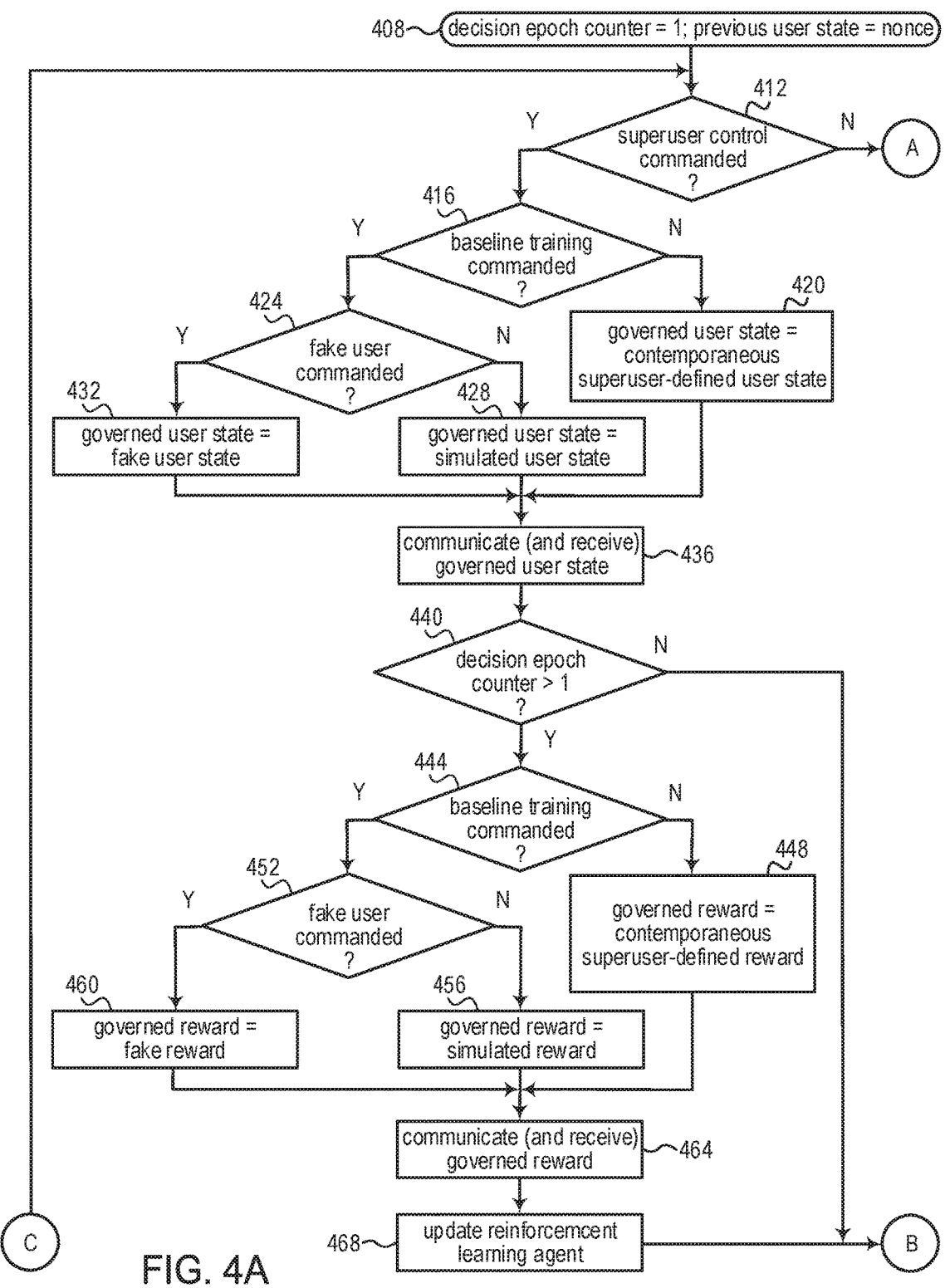
FIG. 4A-4D are a flowchart illustration of the process of FIG. 3.
Figure 4B:
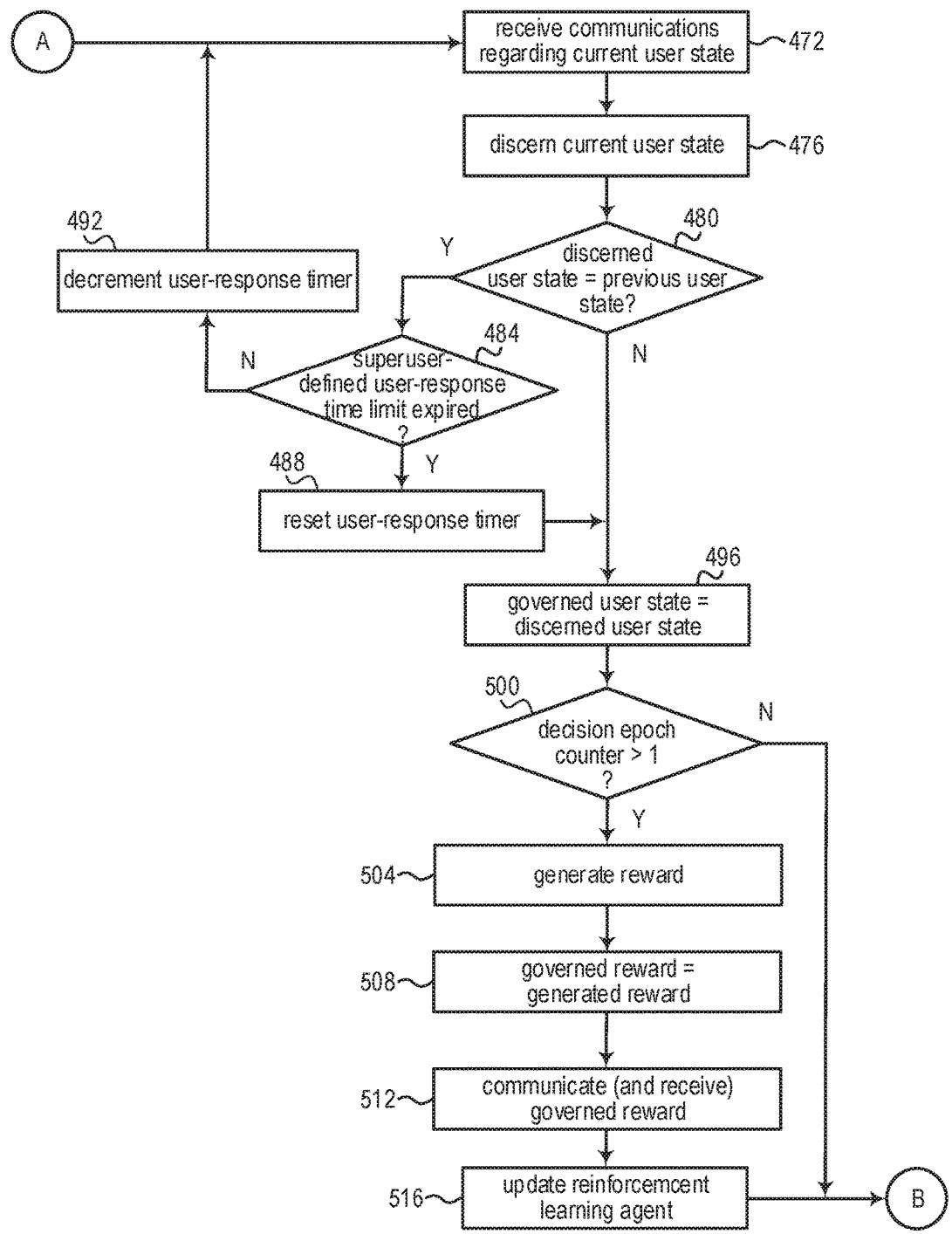
Figure 4C:
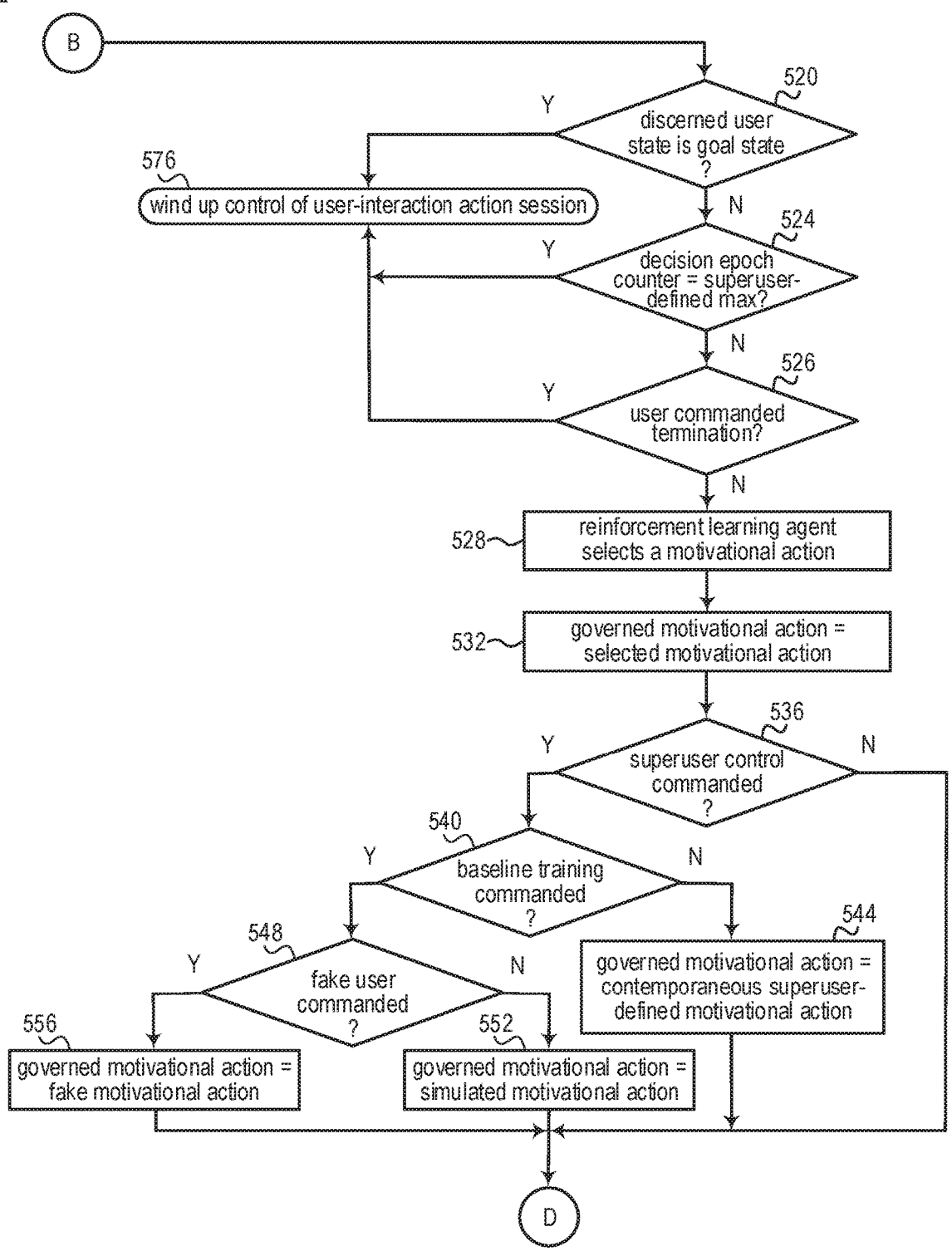
Figure 4D:
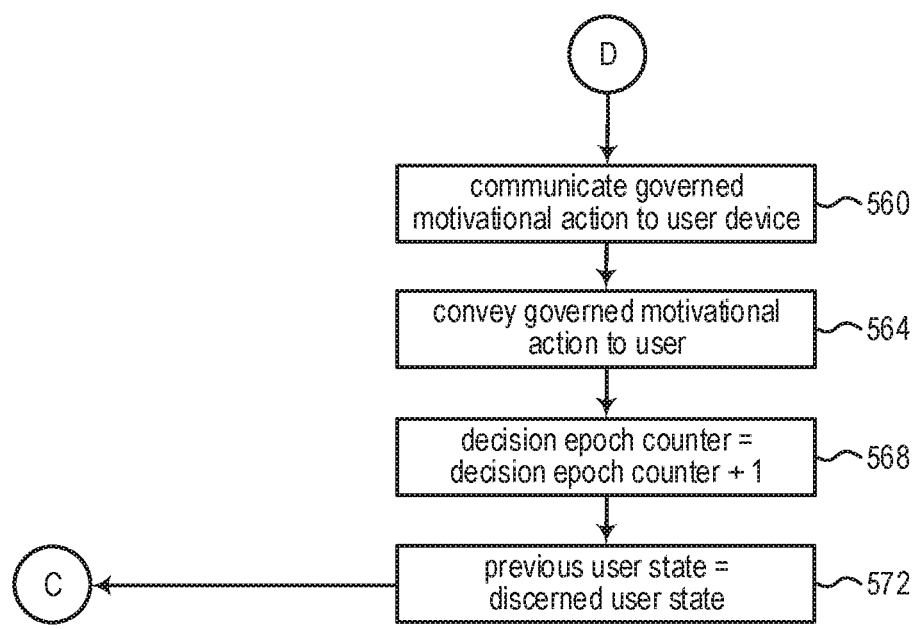

FIG. 3 is a process flow diagram illustration of the finite-state, overridable, tiered-rewarding, effectively continuous-sojourn-time Markov decision process 300 in accordance with aspects of the present disclosure. The process 300 is configured to control a current goal-oriented user-interaction session. In some embodiments, the goal of the user-interaction session ("session goal") may be to get the user to make a purchase. In some embodiments, the session goal may be to get the user to make a charitable donation, respond to a survey, open a financial account, or enter into a lease agreement. In other embodiments, the session goal may be any other suitable user behavior or response. In some instances, one or more steps of the process 300 may be performed by one or more of the server devices 130 (the server devices 130 per se are not explicitly illustrated in FIG. 3, but see FIG. 1), the IAM 200 (the IAM 200 per se is not explicitly illustrated in FIG. 3, but see FIG. 2), and/or one or more of the other systems, components, methods, and/or processes described herein. For clarity of exposition, the following description(s) of the process 300 may refer to one or more of such systems, components, methods, and/or processes. Nevertheless, it should be appreciated that the process 300 and/or any one or more of its particular steps may be performed by any suitable system(s), component(s), method(s), and/or process(es). It should also be appreciated that the process 300 may be performed concurrently or substantially concurrently with any other method(s) and/or process(es) described herein.

The process 300 includes the reinforcement learning agent tasks 304. The reinforcement learning agent tasks 304 are configured to provide a reinforcement learning agent that: (1) receives communications of governed user states (as environmental state inputs) from the override control tasks 312; (2) receives communications of governed rewards (as reward inputs) from the override control tasks 312; (3) selects a respective motivational action (from a superuser-defined motivational action space) corresponding to each governed user state (except at a final decision epoch 364, described further below), based on the governed user states and the governed rewards; (4) communicates the selected motivational actions (as action outputs) to the override control tasks 312; and (5) retains what the reinforcement learning agent learns from the user-interaction session (as baseline learning for the next user-interaction session). In some embodiments, the reinforcement learning agent may comprise one or more model-free reinforcement learning engines. Non-limiting examples of suitable model-free reinforcement learning engines include a deep Q network ("DQN"), a double deep Q network ("DDQN"), a dueling double deep Q network ("Dueling DDQN"), and asynchronous advantage actor-critic agents ("A3C"). In some embodiments, the reinforcement learning agent may comprise any other one or more suitable model-free reinforcement learning engines and/or any one or more suitable model-based machine learning engines.

The superuser-defined motivational action space comprises a finite number, k (not explicitly illustrated), of particular sets, A, of superuser-defined motivational actions. Each set, A, of superuser-defined motivational actions comprises an identification of each of a finite number of superuser-defined motivational actions available for influencing a finite number, k (not explicitly illustrated), of respective particular superuser-defined user states, S (described further below in connection with the user interface tasks 308), within a superuser-defined finite user state space. Non-limiting examples of possible motivational actions include: (1) communicating zero or more motivational, promotional, solicitous, and/or inquisitive in-app messages, emails, graphical displays, drop-down lists, audio messages, and/or videos to the user; and/or (2) connecting the user to a human or machine help agent.

The process 300 also includes the user interface tasks 308. The user interface tasks 308 are configured to: (1) receive communications of superuser control commands (described further below in connection with the override control tasks 312) from a respective user device (e.g., one of the user devices 118, shown in FIG. 1); (2) communicate the superuser control commands to the override control tasks 312; (3) receive communications regarding current user states from a respective user device (e.g., one of the user devices 118, shown in FIG. 1); (4) discern the respective user states and assign their respective runtime variable classification attributes (discussed further below) from the communications regarding the current user states (e.g., by using one or more suitable lookup tables, translation tables, or other reference resources to determine which of the communications correspond to which of the particular superuser-defined user states, S); (5) communicate the discerned user states to the override control tasks 312; (6) generate a respective reward corresponding to each discerned user state (except at an initial decision epoch 316, described further below); (7) communicate the rewards to the override control tasks 312; (8) receive communications of governed motivational actions from the override control tasks 312; and (9) communicate the governed motivational actions to the respective user device.

As noted above in connection with the reinforcement learning agent tasks 304, the superuser-defined finite user state space comprises the finite number, k (not explicitly illustrated), of the respective particular superuser-defined user states, S. Non-limiting examples of possible superuser-defined user states include: (1) one or more mouse clicks that may be made by the user during the user-interaction session; (2) one or more navigation paths that may be traversed by the user during the user-interaction session; (3) one or more screen images that may be uploaded by or otherwise associated with the user during the user-interaction session; (4) one or more data profiles that may be associated with the user during the user-interaction session; and (5) current usage data that may be associated with the user during the user-interaction session.

Each superuser-defined user state, S, also comprises a runtime variable classification attribute. Each of these classification attributes conveys a superuser-defined tiered reinforcement learning reward categorization of the respective superuser-defined user state, S, as either a "goal state," a "milestone state," a "simply positive state," a "simply negative state," or an "abort state," such that: (1) the goal state categorization corresponds to the superuser-defined user state, S, for which a superuser has predetermined the session goal will be achieved; (2) each respective milestone state categorization (if any) corresponds to a respective superuser-defined user state, S, at which the session goal will not be achieved, but, nevertheless, some suitably significant advancement toward the session goal will be reached (there may be zero or more milestone states); (3) each respective simply positive state categorization (if any) corresponds to a respective superuser-defined user state, S, other than a goal state or a milestone state, at which the session goal will not be achieved, but, nevertheless, some relatively less significant advancement toward the session goal will be reached (there may be zero or more simply positive states); (4) each respective negative state categorization (if any) corresponds to a respective superuser-defined user state, S, that is neither a goal state, nor a milestone state, nor a simply positive state, nor an abort state, at which some divergence away from the session goal has occurred (there may be zero or more negative states); and (5) each respective abort state categorization (if any) corresponds to a respective superuser-defined user state, S, that is not a goal state yet is nevertheless a state at which the process 300 will still wind up control of the user-interaction session (there may be zero or more abort states). Non-limiting examples of possible goal states include: (1) a user mouse click corresponding to a credit card payment for a magazine subscription (when the session goal is to get the user to buy a magazine subscription); and (2) a user mouse click corresponding to final submission of survey responses (when the session goal is to get the user to respond to the survey). Non-limiting examples of possible milestone states include: (1) a user entry or drop-down list selection of a desired genre (when the session goal is to get the user to buy a magazine subscription); (2) a user's submission of the user's demographic information (when the session goal is to get the user to respond to a survey); and (3) a user's acceptance of a promotional video. A non-limiting example of a possible simply positive state is a user request to peruse available magazine genres (when the session goal is to get the user to buy a magazine subscription). A non-limiting example of a negative state is a user's rejection of an offer to sell a T-shirt to the user at an undiscounted price. It should be appreciated that an abort state may be any state (other than a goal state) at which a user commands termination of the user-interaction session, at which the process 300 has reached a predetermined maximum number of decision epochs, or at which the process 300 will wind up control of the user-interaction session for any other reason.

The user interface tasks 308 are further configured to generate the respective rewards corresponding to the one or more respective user states that may follow an initial user state, $S_i$ (i.e., at each second or subsequent decision epoch at which the process 300 reaches a current user state corresponding to any one of the superuser-defined user states, S) based on the current user state and the categorization of the corresponding superuser-defined user state, S. More particularly, the user interface tasks 308 are configured to generate (at each second or subsequent decision epoch) each respective reward, such that: (1) when the current user state corresponds to the particular superuser-defined user state, S, that is categorized as the goal state, the reward will have a suitably relatively high-weighted, positive, superuser-defined value; (2) when the current user state corresponds to one of the superuser-defined user states, S, that is categorized as a simply positive state, the reward will have a suitably relatively low-weighted, positive, superuser-defined value; (3) when the current user state corresponds to one of the superuser-defined user states, S, that is categorized as a milestone state, the reward will have a suitably relatively medium-weighted, positive, superuser-defined value; (4) when the current user state corresponds to one of the superuser-defined user states, S, that is categorized as a negative state, the reward will have a suitably relatively low-weighted, negative, superuser-defined value; and (5) when the current user state corresponds to one of the superuser-defined user states, S, that is categorized as an abort state, the reward will have a suitably relatively high-weighted, negative, superuser-defined value.

The process 300 also includes the override control tasks 312. The override control tasks 312 are configured to facilitate "baseline training" (i.e., superuser-defined training of the reinforcement learning agent prior to the user-interaction session) and to facilitate contemporaneous superuser override control of the user-interaction session. More particularly, the override control tasks 312 are configured to: (1) receive communications of the superuser control commands from the user interface tasks 308; (2) receive communications of the discerned user states from the user interface tasks 308; (3) generate the respective governed user states; (4) communicate the governed user states to the reinforcement learning agent tasks 304; (5) receive communications of the rewards from the user interface tasks 308; (6) generate the respective governed rewards; (7) communicate the governed rewards to the reinforcement learning agent tasks 304; (8) receive communications of the selected motivational actions from the reinforcement learning agent tasks 304; (9) generate the respective governed motivational actions; and (10) communicate the governed motivational actions to the user interface tasks 308.

Further, the override control tasks 312 are configured to generate the outputs of the override control tasks 312 (namely, the governed user states, the governed rewards, and the governed motivational actions) based on the inputs to the override control tasks 312 (namely, the discerned user states, the rewards, and the selected motivational actions), based on the superuser control commands and based on superuser-defined data and/or one or more superuser-defined rules, such that: (1) when the superuser control commands call for baseline training using one or more superuser-defined "fake users," the override control tasks 312 will generate the outputs of the override control tasks 312 using the fake users rather than by using the respective discerned user states, the respective rewards, and/or the respective selected motivational actions (i.e., the override control tasks 312 will effectively overwrite or override the discerned user states, the rewards, and/or the selected motivational actions with the respective superuser-defined fake user data); (2) when the superuser control commands call for baseline training using one or more superuser-defined "simulated users," the override control tasks 312 will generate the outputs of the override control tasks 312 using the simulated users rather than by using the respective discerned user states, the respective rewards, and/or the respective selected motivational actions (i.e., the override control tasks 312 will effectively overwrite or override the discerned user states, the rewards, and/or the selected motivational actions with the respective superuser-defined simulated user data); (3) when the superuser control commands call for one or more contemporaneous superuser overrides, the override control tasks 312 will generate the outputs of the override control tasks 312 using the contemporaneous superuser overrides rather than by using the respective discerned user states, the respective rewards, and/or the respective selected motivational actions (i.e., the override control tasks 312 will effectively overwrite or override the discerned user states, the rewards, and/or the selected motivational actions with the respective contemporaneous superuser override data); and (4) when the superuser control commands do not call for any baseline training or contemporaneous superuser overrides, the override control tasks 312 will simply pass the inputs to the override control tasks 312 through as the respective outputs of the override control tasks 312 (i.e., the override control tasks 312 will generate the outputs of the override control tasks 312 by effectively copying the discerned user states, the rewards, and the selected motivational actions into the governed user states, the governed rewards, and the governed motivational actions, respectively).

It should be appreciated that one or more of the fake users may be based on one or more preexisting policies, rules, or other stratagems for user-interaction that have been conceived independently of the reinforcement learning agent. In some instances, a fake user may include a superuser-defined state paired with a superuser-defined action that together conform to such a preexisting policy, rule, or other stratagem for user-interaction. Such a fake user may be configured to, when the superuser control commands cause the override control tasks 312 to use the fake user: (1) when the responsive selected motivational action (from the reinforcement learning agent tasks 304) agrees with the superuser-defined action for the fake user, generate a suitably large positive reward (which the override control tasks 312 will in turn output as the governed reward); and (2) when the responsive selected motivational action does not agree with the superuser-defined action for the fake user, generate a suitably large negative reward (which the override control tasks 312 will in turn output as the governed reward). For example, when a preexisting business rule comprises "send a notification to the user when the user adds an item to the user's shopping cart," a fake user may be configured to: (1) provide a very high positive reward when the user interface learning tasks 308 communicate "item added to shopping cart" as the discerned user state and (in response) the reinforcement learning agent tasks 304 communicate "notify the user" as the selected motivational action; and (2) provide a very high magnitude negative reward when the user interface tasks 308 communicate "item added to shopping cart" as the discerned user state but (in response) the reinforcement learning agent tasks 304 do not communicate "notify the user" as the selected motivational action.

Meanwhile, one or more of the simulated users may be based on statistical data regarding historical behaviors of interactions with one or more humans independently of the reinforcement learning agent. For example, statistical analyses of user profiles may be used to identify typical user features or characteristics. Further, such user feature data may be extracted and categorized to create representative user personas. Thereafter, a representative state transition matrix may be constructed for each user persona, and the simulated users may be generated based on the respective representative state transition matrices.

Referring still to FIG. 3, in operation the process 300 includes the initial decision epoch 316, zero or more intermediate decision epochs 340, and the final decision epoch 364. At the initial decision epoch 316, the process 300 begins control of the user-interaction session, at the initial user state, $S_i$, and the reinforcement learning agent tasks 304, the user interface tasks 308, and the override control tasks 312 cooperate accordingly. In some instances, optional superuser control commands and data, $SU_i$, may be used during the initial decision epoch 316. Nevertheless, it should be appreciated that the reinforcement learning agent may begin the initial decision epoch 316 with learning retained from one or more previous and/or concurrent user-interaction sessions.

At the intermediate decision epochs 340, the process 300 further controls the user-interaction session, at various respective intermediate user states, $S_m$, and the reinforcement learning agent tasks 304, the user interface tasks 308, and the override control tasks 312 cooperate accordingly. In some instances, various optional superuser control commands and data, $SU_m$, may be used during any of the intermediate decision epochs 340. Depending on user reactions and/or superuser inputs, any intermediate user state, $S_m$, may be a milestone state, a simply positive state, or a negative state (but not a goal state). However, it should be appreciated that when the goal state is the next user state following the initial user state, $S_i$, the process 300 does not include any intermediate decision epochs 340 (i.e., in such instances the number of intermediate decision epochs 340 is zero).

At the final decision epoch 364, the process 300 winds up control of the user-interaction session, at a final user state, $S_f$, and the reinforcement learning agent tasks 304, the user interface tasks 308, and the override control tasks 312 cooperate accordingly. In some instances, optional superuser control commands and data, $SU_{f}$, may be used during the final decision epoch 364. Depending on user reactions and/or superuser inputs, the final user state, $S_{f}$, may be a goal state, a milestone state, a simply positive state, or a negative state. It should be appreciated that the winding up control of the user-interaction session may include the reinforcement learning agent saving and retaining what the reinforcement learning agent has learned (as baseline learning for the next user-interaction session).

FIG. 4A-4D are a flowchart illustration of the process 300. At step 408, the process 300 (e.g., using the DECM 292) sets a decision epoch counter to 1 and sets a "previous user state" variable to a suitable nonce value. From step 408, the process goes to (and continues at) step 412.

At step 412, the process 300 (e.g., using the override control tasks 312) determines whether communications (e.g., from one of the user devices 118) (hereinafter referred to as the "current superuser device") indicate that superuser control over the user-interaction session is commanded. If superuser control is commanded, then the process 300 goes to (and continues at) step 416; otherwise, the process 300 goes to (and continues at) step 472.

At step 416, the process 300 (e.g., using the override control tasks 312) determines whether communications from the current superuser device indicate that baseline training is commanded. If baseline training is commanded, then the process 300 goes to (and continues at) step 424; otherwise, the process 300 goes to (and continues at) step 420.

At step 420, the process 300 (e.g., using the override control tasks 312) sets the governed user state to the contemporaneous superuser-defined user state. From step 420, the process goes to (and continues at) step 436.

At step 424, the process 300 (e.g., using the override control tasks 312) determines whether communications from the current superuser device indicate that using a fake user for the baseline training is commanded. If using a fake user is commanded, then the process 300 goes to (and continues at) step 432; otherwise, the process 300 goes to (and continues at) step 428.

At step 428, the process 300 (e.g., using the override control tasks 312) sets the governed user state to the superuser-defined simulated user state. From step 428, the process goes to (and continues at) step 436.

At step 432, the process 300 (e.g., using the override control tasks 312) sets the governed user state to the superuser-defined fake user state. From step 432, the process goes to (and continues at) step 436.

At step 436, the process 300 communicates the governed user state to the reinforcement learning agent and the reinforcement learning agent receives the governed user state (e.g., using the override control tasks 312 and the reinforcement learning agent tasks 304, respectively). From step 436, the process goes to (and continues at) step 440.

At step 440, the process 300 (e.g., using the DECM 292) determines whether the decision epoch counter is greater than 1. If the decision epoch counter is greater than 1, then the process 300 goes to (and continues at) step 444; otherwise, the process 300 goes to (and continues at) step 520.

At step 444, the process 300 (e.g., using the override control tasks 312) determines whether communications from the current superuser device indicate that baseline training is commanded. If baseline training is commanded, then the process 300 goes to (and continues at) step 452; otherwise, the process 300 goes to (and continues at) step 448.

At step 448, the process 300 (e.g., using the override control tasks 312) sets the governed reward to the contemporaneous superuser-defined reward. From step 448, the process goes to (and continues at) step 464.

At step 452, the process 300 (e.g., using the override control tasks 312) determines whether communications from the current superuser device indicate that using a fake user for the baseline training is commanded. If using a fake user is commanded, then the process 300 goes to (and continues at) step 460; otherwise, the process 300 goes to (and continues at) step 456.

At step 456, the process 300 (e.g., using the override control tasks 312) sets the governed reward to the superuser-defined simulated reward. From step 456, the process goes to (and continues at) step 464.

At step 460, the process 300 (e.g., using the override control tasks 312) sets the governed reward to the superuser-defined fake reward. From step 460, the process goes to (and continues at) step 464.

At step 464, the process 300 communicates the governed reward to the reinforcement learning agent and the reinforcement learning agent receives the governed reward (e.g., using the override control tasks 312 and the reinforcement learning agent tasks 304, respectively). From step 464, the process goes to (and continues at) step 468.

At step 468, the process 300 (e.g., using the reinforcement learning agent tasks 304) updates the reinforcement learning agent (e.g., causes the reinforcement learning agent to execute a cycle or iteration of machine learning computations in search of an optimum policy for selecting motivational actions for driving the user toward the session goal). From step 468, the process 300 goes to (and continues at) step 520.

At step 472, the process 300 (e.g., using the user interface tasks 308) receives communications (e.g., from one of the user devices 118) (hereinafter referred to as the "current user device") regarding the current user state. From step 472, the process 300 goes to (and continues at) step 476.

At step 476, the process 300 (e.g., using the user interface tasks 308) discerns the user state from the communications regarding the current user state. From step 476, the process 300 goes to (and continues at) step 480.

At step 480, the process 300 (e.g., using the DECM 292) determines whether the discerned user state equals the previous user state (i.e., the process 300 determines whether the user state has changed). If the discerned user state equals the previous user state, then the process 300 goes to (and continues at) step 484; otherwise, the process 300 goes to (and continues at) step 496.

At step 484, the process 300 (e.g., using the DECM 292) determines whether a superuser-defined user-response time limit has expired. If the user-response time limit has expired, then the process 300 goes to (and continues at) step 488; otherwise, the process 300 goes to (and continues at) step 492.

At step 488, the process 300 (e.g., using the DECM 292) resets a user-response timer. From step 488, the process 300 goes to (and continues at) step 496.

At step 492, the process 300 (e.g., using the DECM 292) suitably decrements the user-response timer. From step 492, the process 300 goes to (and continues at) step 472.

At step 496, the process 300 (e.g., using the override control tasks 312) sets the governed user state to the discerned user state. From step 496, the process 300 goes to (and continues at) step 500.

At step 500, the process 300 (e.g., using the DECM 292) determines whether the decision epoch counter is greater than 1. If the decision epoch counter is greater than 1, then the process 300 goes to (and continues at) step 504; otherwise, the process 300 goes to (and continues at) step 520.

At step 504, the process 300 (e.g., using the user interface tasks 308) generates the reward. From step 504, the process 300 goes to (and continues at) step 508.

At step 508, the process 300 (e.g., using the override control tasks 312) sets the governed reward to the generated reward. From step 508, the process goes to (and continues at) step 512.

At step 512, the process 300 communicates the governed reward to the reinforcement learning agent and the reinforcement learning agent receives the governed reward (e.g., using the override control tasks 312 and the reinforcement learning agent tasks 304, respectively). From step 512, the process goes to (and continues at) step 516.

At step 516, the process 300 (e.g., using the reinforcement learning agent tasks 304) updates the reinforcement learning agent. From step 516, the process 300 goes to (and continues at) step 520.

At step 520, the process 300 (e.g., using the DECM 292) determines whether the discerned user state is the goal state. If the discerned user state is the goal state, then the process 300 goes to (and winds up at) step 576; otherwise, the process 300 goes to (and continues at) step 524.

At step 524, the process 300 (e.g., using the DECM 292) determines whether the decision epoch counter equals a superuser-defined maximum number. If the decision epoch counter equals the maximum number, then the process 300 goes to (and winds up at) step 576; otherwise, the process 300 goes to (and continues at) step 526.

At step 526, the process 300 (e.g., using the user interface tasks 308) determines whether the user has commanded termination of the user-interaction session. If the user has commanded termination of the user-interaction session, then the process 300 goes to (and winds up at) step 576; otherwise, the process 300 goes to (and continues at) step 528.

At step 528, the process 300 (e.g., using the reinforcement learning agent tasks 304, which provide the reinforcement learning agent) selects a motivational action. From step 528, the process 300 goes to (and continues at) step 532.

At step 532, the process 300 (e.g., using the override control tasks 312) sets the governed motivational action to the selected motivational action. From step 532, the process goes to (and continues at) step 536.

At step 536, the process 300 (e.g., using the override control tasks 312) determines whether communications (e.g., from one of the user devices 118) (hereinafter referred to as the "current superuser device") indicate that superuser control over the user-interaction session is commanded. If superuser control is commanded, then the process 300 goes to (and continues at) step 540; otherwise, the process 300 goes to (and continues at) step 560.

At step 540, the process 300 (e.g., using the override control tasks 312) determines whether communications from the current superuser device indicate that baseline training is commanded. If baseline training is commanded, then the process 300 goes to (and continues at) step 548; otherwise, the process 300 goes to (and continues at) step 544.

At step 544, the process 300 (e.g., using the override control tasks 312) sets the governed motivational action to the contemporaneous superuser-defined motivational action. From step 544, the process goes to (and continues at) step 560.

At step 548, the process 300 (e.g., using the override control tasks 312) determines whether communications from the current superuser device indicate that using a fake user for the baseline training is commanded. If using a fake user is commanded, then the process 300 goes to (and continues at) step 556; otherwise, the process 300 goes to (and continues at) step 552.

At step 552, the process 300 (e.g., using the override control tasks 312) sets the governed motivational action to the superuser-defined simulated motivational action. From step 552, the process goes to (and continues at) step 560.

At step 556, the process 300 (e.g., using the override control tasks 312) sets the governed motivational action to the superuser-defined fake motivational action. From step 556, the process goes to (and continues at) step 560.

At step 560, the process 300 (e.g., using the user interface tasks 308) communicates the governed motivational action to the current user device. From step 560, the process goes to (and continues at) step 564.

At step 564, the process 300 (e.g., using the current user device) conveys the governed motivational action to the respective user. From step 564, the process goes to (and continues at) step 568.

At step 568, the process 300 (e.g., using the DECM 292) increments the decision epoch counter. From step 568, the process 300 goes to (and continues at) step 572.

At step 572, the process 300 (e.g., using the DECM 292) sets the previous user state to the discerned user state. From step 572, the process goes to (and continues at) step 412.

At step 576, the process 300 winds up control of the user-interaction session.

Figure 5:
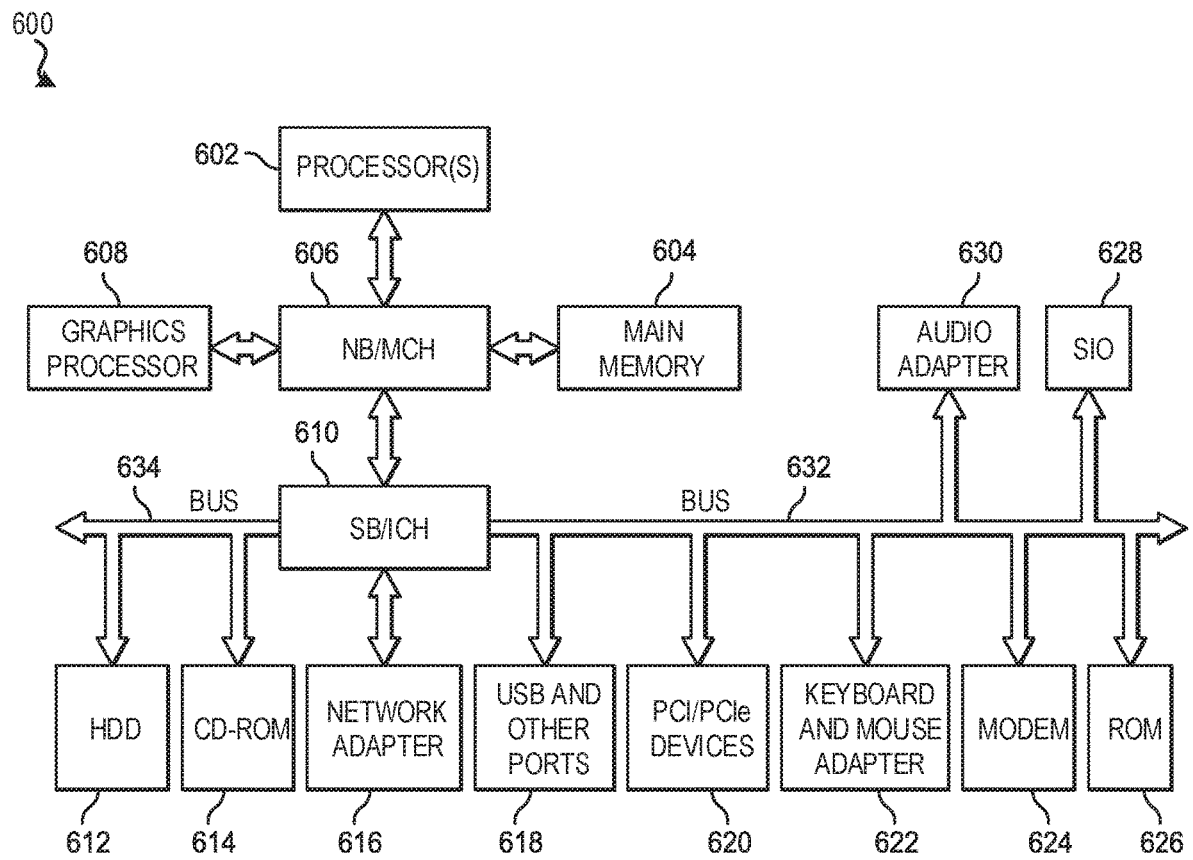
FIG. 5 is a block diagram illustration of a hardware architecture of a data processing system in accordance with aspects of the present disclosure.

FIG. 5 is a block diagram illustration of a hardware architecture of a data processing system 600 in accordance with aspects of the present disclosure. In some embodiments, one or more of the systems and/or components described herein (e.g., the network 112, the one or more user devices 118, the one or more remote data-storage modules 124, the one or more server devices 130, etc.) may be implemented using a corresponding one or more of the data processing system 600. Moreover, the data processing system 600 may be configured to store and execute one or more instructions of one or more of the methods and/or any other processes described herein.

The data processing system 600 employs a hub architecture including north bridge and memory controller hub ("NB/MCH") 606 and south bridge and input/output ("I/O") controller hub ("SB/ICH") 610. Processor(s) 602, main memory 604, and graphics processor 608 are connected to NB/MCH 606. Graphics processor 608 may be connected to NB/MCH 606 through an accelerated graphics port ("AGP"). A computer bus, such as bus 632 or bus 634, may be implemented using any type of communication fabric or architecture that provides for a transfer of data between different components or devices attached to the fabric or architecture.

Network adapter 616 connects to SB/ICH 610. Audio adapter 630, keyboard and mouse adapter 622, modem 624, read-only memory ("ROM") 626, hard disk drive ("HDD") 612, compact disk read-only memory ("CD-ROM") drive 614, universal serial bus ("USB") ports and other communication ports 618, and peripheral component interconnect/peripheral component interconnect express ("PCI/PCIe") devices 620 connect to SB/ICH 610 through bus 632 and bus 634. PCI/PCIe devices may include, for example, Ethernet adapters, add-in cards, and personal computing ("PC") cards for notebook computers. PCI uses a card bus controller, while PCIe does not. ROM 626 may comprise, for example, a flash basic input/output system ("BIOS"). Modem 624 or network adapter 616 may be used to transmit and receive data over a network.

HDD 612 and CD-ROM drive 614 connect to SB/ICH 610 through bus 634. HDD 612 and CD-ROM drive 614 may use, for example, an integrated drive electronics ("IDE") or serial advanced technology attachment ("SATA") interface. In some embodiments, the HDD 612 may be replaced by other forms of data storage devices including, but not limited to, solid-state drives ("SSDs"). A super I/O ("SIO") device 628 may be connected to SB/ICH 610. SIO device 628 may comprise a chip on the motherboard that is configured to assist in performing less demanding controller functions for the SB/ICH 610 such as controlling a printer port, controlling a fan, and/or controlling the small light emitting diodes ("LEDS") of the data processing system 600.

The data processing system 600 may include a single processor 602 or may include a plurality of processors 602. Additionally, processor(s) 602 may have multiple cores. In some embodiments, data processing system 600 may employ a large number of processors 602 that include hundreds or thousands of processor cores. In some embodiments, the processors 602 may be configured to perform a set of coordinated computations in parallel.

An operating system is executed on the data processing system 600 using the processor(s) 602. The operating system coordinates and provides control of various components within the data processing system 600. Various applications and services may run in conjunction with the operating system. Instructions for the operating system, applications, and other data are located on storage devices, such as one or more of the HDD 612, and may be loaded into main memory 604 for execution by processor(s) 602. In some embodiments, additional instructions or data may be stored on one or more external devices. The processes described herein for the illustrative embodiments may be performed by processor(s) 602 using computer usable program code, which may be located in a memory such as, for example, main memory 604, ROM 626, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In accordance with aspects of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
    beginning control of a user-interaction session;
    receiving a first communication from a user device;
    determining a first user state based at least in part on the first communication from the user device;
    communicating the first user state to a reinforcement learning agent;
    using the reinforcement learning agent to select a first motivational action based at least in part on the first user state;
    communicating the first motivational action to the user device;
    receiving a second communication from the user device;
    determining a second user state based at least in part on the second communication from the user device, wherein the second user state comprises an attribute conveying a tiered reinforcement learning reward categorization;
    generating a reward based at least in part on the tiered reinforcement learning reward categorization;
    communicating the reward to the reinforcement learning agent;
    communicating the second user state to the reinforcement learning agent;
    updating the reinforcement learning agent; and
    determining, based at least in part on whether the second user state corresponds to a goal of the user-interaction session, to wind up control of the user-interaction session.

2. The method of claim 1, wherein determining the first user state comprises determining the first user state based at least in part on a stratagem for user-interaction conceived independently of the reinforcement learning agent, and wherein determining the second user state comprises determining the second user state based at least in part on the stratagem for user-interaction.

3. The method of claim 1, wherein determining the first user state comprises determining the first user state based at least in part on statistical data regarding historical behaviors of interactions with at least one human independently of the reinforcement learning agent, and wherein determining the second user state comprises determining the second user state based at least in part on the statistical data.

4. The method of claim 1, wherein determining the first user state comprises using a reference resource to determine that the first communication corresponds to a first predefined user state, wherein determining the first user state excludes determining the first user state based at least in part on a stratagem for user-interaction conceived independently of the reinforcement learning agent, wherein determining the first user state excludes determining the first user state based at least in part on statistical data regarding historical behaviors of interactions with one or more humans independently of the reinforcement learning agent, and wherein determining the second user state comprises determining the second user state based at least in part on a basis selected from the group consisting of:
    a stratagem for user-interaction conceived independently of the reinforcement learning agent, and
    statistical data regarding historical behaviors of interactions with one or more humans independently of the reinforcement learning agent.

5. The method of claim 1, wherein updating the reinforcement learning agent comprises updating a model-free reinforcement learning engine.

6. The method of claim 5, wherein updating the model-free reinforcement learning engine comprises updating at least one reinforcement learning engine selected from the group consisting of a deep Q network, a double deep Q network, a dueling double deep Q network, and asynchronous advantage actor-critic agents.

7. The method of claim 1, wherein the goal of the user-interaction session is at least one user response selected from the group consisting of a user making a purchase, the user making a charitable donation, the user responding to a survey, the user opening a financial account, and the user entering into a lease agreement.

8. A system, comprising:
    a memory having instructions therein; and
    at least one processor in communication with the memory, wherein the at least one processor is configured to execute the instructions to:

begin control of a user-interaction session;
receive a first communication from a user device;
determine a first user state based at least in part on the first communication from the user device;
communicate the first user state to a reinforcement learning agent;
use the reinforcement learning agent to select a first motivational action based at least in part on the first user state;
communicate the first motivational action to the user device;
receive a second communication from the user device;
determine a second user state based at least in part on the second communication from the user device, wherein the second user state comprises an attribute conveying a tiered reinforcement learning reward categorization;
generate a reward based at least in part on the tiered reinforcement learning reward categorization;
communicate the reward to the reinforcement learning agent;
communicate the second user state to the reinforcement learning agent;
update the reinforcement learning agent; and
determine, based at least in part on whether the second user state corresponds to a goal of the user-interaction session, to wind up control of the user-interaction session.

9. The system of claim 8, wherein the at least one processor is further configured to execute the instructions to:
determine the first user state based at least in part on a stratagem for user-interaction conceived independently of the reinforcement learning agent; and
determine the second user state based at least in part on the stratagem for user-interaction.

10. The system of claim 8, wherein the at least one processor is further configured to execute the instructions to:
determine the first user state based at least in part on statistical data regarding historical behaviors of interactions with at least one human independently of the reinforcement learning agent; and
determine the second user state based at least in part on the statistical data.

11. The system of claim 8, wherein the at least one processor is further configured to execute the instructions to:
use a reference resource to determine that the first communication corresponds to a first predefined user state;
determine the first user state without reliance on a stratagem for user-interaction conceived independently of the reinforcement learning agent;
determine the first user state without reliance on statistical data regarding historical behaviors of interactions with one or more humans independently of the reinforcement learning agent; and
determine the second user state based at least in part on a basis selected from the group consisting of:
a stratagem for user-interaction conceived independently of the reinforcement learning agent, and
statistical data regarding historical behaviors of interactions with one or more humans independently of the reinforcement learning agent.

12. The system of claim 8, wherein the at least one processor is further configured to execute the instructions to update a model-free reinforcement learning engine to update the reinforcement learning agent.

13. The system of claim 12, wherein the at least one processor is further configured to execute the instructions to update at least one reinforcement learning engine selected from the group consisting of a deep Q network, a double deep Q network, a dueling double deep Q network, and asynchronous advantage actor-critic agents to update the model-free reinforcement learning engine.

14. The system of claim 8, wherein the goal of the user-interaction session is at least one user response selected from the group consisting of a user making a purchase, the user making a charitable donation, the user responding to a survey, the user opening a financial account, and the user entering into a lease agreement.

15. A computer program product, the computer program product comprising a computer readable storage medium having program instructions embodied therewith, the program instructions executable by at least one processor to cause the at least one processor to:
begin control of a user-interaction session;
receive a first communication from a user device;
determine a first user state based at least in part on the first communication from the user device;
communicate the first user state to a reinforcement learning agent;
use the reinforcement learning agent to select a first motivational action based at least in part on the first user state;
communicate the first motivational action to the user device;
receive a second communication from the user device;
determine a second user state based at least in part on the second communication from the user device, wherein the second user state comprises an attribute conveying a tiered reinforcement learning reward categorization;
generate a reward based at least in part on the tiered reinforcement learning reward categorization;
communicate the reward to the reinforcement learning agent;
communicate the second user state to the reinforcement learning agent;
update the reinforcement learning agent; and
determine, based at least in part on whether the second user state corresponds to a goal of the user-interaction session, to wind up control of the user-interaction session.

16. The computer program product of claim 15, wherein the program instructions are further executable by the at least one processor to cause the at least one processor to:
determine the first user state based at least in part on a stratagem for user-interaction conceived independently of the reinforcement learning agent; and
determine the second user state based at least in part on the stratagem for user-interaction.

17. The computer program product of claim 15, wherein the program instructions are further executable by the at least one processor to cause the at least one processor to:
determine the first user state based at least in part on statistical data regarding historical behaviors of interactions with at least one human independently of the reinforcement learning agent; and
determine the second user state based at least in part on the statistical data.

18. The computer program product of claim 15, wherein the program instructions are further executable by the at least one processor to cause the at least one processor to:
use a reference resource to determine that the first communication corresponds to a first predefined user state;

determine the first user state without reliance on a stratagem for user-interaction conceived independently of the reinforcement learning agent;

determine the first user state without reliance on statistical data regarding historical behaviors of interactions with one or more humans independently of the reinforcement learning agent; and determine the second user state based at least in part on a basis selected from the group consisting of:
- a stratagem for user-interaction conceived independently of the reinforcement learning agent, and
- statistical data regarding historical behaviors of interactions with one or more humans independently of the reinforcement learning agent.

19. The computer program product of claim 15, wherein the program instructions are further executable by the at least one processor to cause the at least one processor to update at least one reinforcement learning engine selected from the group consisting of a deep Q network, a double deep Q network, a dueling double deep Q network, and asynchronous advantage actor-critic agents to update the reinforcement learning agent.

20. The computer program product of claim 15, wherein the goal of the user-interaction session is at least one user response selected from the group consisting of a user making a purchase, the user making a charitable donation, the user responding to a survey, the user opening a financial account, and the user entering into a lease agreement.

* * * * *